US008768922B2

(12) United States Patent
Crane et al.

(10) Patent No.: US 8,768,922 B2
(45) Date of Patent: Jul. 1, 2014

(54) AD RETRIEVAL FOR USER SEARCH ON SOCIAL NETWORK SITES

(75) Inventors: Andrew S. Crane, Seattle, WA (US); Philip Lee, Bellevue, WA (US); Dou Shen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 655 days.

(21) Appl. No.: 12/028,628

(22) Filed: Feb. 8, 2008

(65) Prior Publication Data

US 2009/0204598 A1 Aug. 13, 2009

(51) Int. Cl.
*G06F 17/30* (2006.01)
(52) U.S. Cl.
CPC .................. *G06F 17/30867* (2013.01)
USPC ........... 707/733; 707/706; 707/713; 707/722; 707/723; 707/724; 707/725; 707/726; 707/727; 707/728; 707/731; 707/732; 707/734; 707/735; 707/736; 707/758; 707/781; 705/14.73; 706/12; 706/45
(58) Field of Classification Search
USPC ......... 707/706, 713, 722–728, 731–736, 758, 707/781, 999.003–6; 705/14.73; 706/12, 45
See application file for complete search history.

(56) References Cited

U.S. PATENT DOCUMENTS

| | | | |
|---|---|---|---|
| 2005/0131894 A1* | 6/2005 | Vuong | 707/5 |
| 2005/0171832 A1 | 8/2005 | Hull | |
| 2006/0218111 A1* | 9/2006 | Cohen | 706/45 |
| 2006/0247940 A1* | 11/2006 | Zhu et al. | 705/1 |
| 2006/0271953 A1 | 11/2006 | Jacoby | |
| 2006/0282328 A1 | 12/2006 | Gerace | |
| 2007/0011161 A1* | 1/2007 | Norton et al. | 707/6 |
| 2007/0100796 A1 | 5/2007 | Wang | |
| 2007/0121843 A1 | 5/2007 | Atazky | |
| 2007/0150537 A1 | 6/2007 | Graham | |
| 2007/0156522 A1 | 7/2007 | Carpenter | |
| 2007/0239534 A1 | 10/2007 | Liu | |
| 2007/0271232 A1* | 11/2007 | Mattox et al. | 707/3 |
| 2007/0282621 A1* | 12/2007 | Altman et al. | 705/1 |
| 2008/0004959 A1* | 1/2008 | Tunguz-Zawislak et al. | 705/14 |
| 2008/0176655 A1* | 7/2008 | James et al. | 463/42 |
| 2008/0208812 A1* | 8/2008 | Quoc et al. | 707/3 |
| 2009/0037254 A1* | 2/2009 | Colando | 705/10 |
| 2011/0112916 A1* | 5/2011 | Baluja et al. | 705/14.73 |

OTHER PUBLICATIONS

The Harmony Guy, "Compare People on Facebook," 2007, http://theharmonyguy.com/2007/11/14/compare-people-on-facebook/.

(Continued)

*Primary Examiner* — Syling Yen
(74) *Attorney, Agent, or Firm* — Joann Dewey; David Andrews; Micky Minhas (57) ABSTRACT

In this invention, systems and methods for providing keywords for advertising are provided. After a user searches for another user in a social network, the webpage or blog of the queried user is retrieved, and keywords are extracted from this webpage. The keywords may be extracted from the user's profile on the social network (e.g., favorite sports, music artists, etc.), or keywords may be extracted from the text of the webpage (e.g., comments that comprise the blog entries). Once extracted, these keywords may then be used by an advertising system to provide targeted advertisements to the user.

18 Claims, 4 Drawing Sheets

(56) References Cited

OTHER PUBLICATIONS

Duncan Riley, "Facebook Will Use Profiles to Target Ads, Predict Future," Techcrunch, 2007, http://www.techcrunch.com/2007/08/22/facebook-will-use-profiles-to-target-ads-predict-future/.

E-consultancy.com Limited, "MySpace Launches New Targeted Ad Platform," 2006, http://www.e-consultancy.com/news-blog/364523/myspace-launches-new-targeted-ad-platform.html.

Heather Havenstein, "Advocates Ask FTC to Investigate Social Networking Ad Plans," Computerworld, 2007, http://www.pcworld.com/article/id,139623-c,onlineprivacy/article.html.

Keith Regan, "MySpace, Facebook Hone Their Advertising Aim," E-Commerce News, Nov. 5, 2007, http://www.ecommercetimes.com/story/social-networking/60162.html.

* cited by examiner

AD RETRIEVAL FOR USER SEARCH ON SOCIAL NETWORK SITES

BACKGROUND

To achieve targeted advertising, advertising systems typically give a value to words entered into a search query. One such method of monetization includes when advertisers bid on the words entered into the search query, and those advertisers that have bid the highest will have an optimal placement of their ad on the search results page, after the search engine presents the results to the search query. In some situations, however, the search query might consist of common words that have not been given a value, resulting in no advertisements targeted to the search.

SUMMARY

In accordance with embodiments of the present invention, systems and methods for providing keywords for advertising are provided. After a user searches for another user in a social network, the webpage or blog of the queried user is retrieved, and keywords are extracted from this webpage. The keywords may be extracted from the user's profile on the social network (e.g., favorite sports, music artists, etc.), or keywords may be extracted from the text of the webpage (e.g., comments that comprise the blog entries). Once extracted, these keywords may then be used by an advertising system to provide targeted advertisements to the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In accordance with embodiments of the present invention, systems and methods for providing keywords for advertising within a social network are provided. After a user searches for another user in a social network, the webpage or blog of the queried user is retrieved, and keywords are extracted from this webpage. The keywords may be extracted from the user's profile on the social network (e.g., favorite sports, music artists, etc.), or keywords may be extracted from the text of the webpage (e.g., comments that comprise the blog entries). Once extracted, these keywords may then be used by an advertising system to provide targeted advertisements to the user.

In accordance with one embodiment of the present invention, one or more computer storage medium with computer-executable instructions embodied thereon for performing a method for determining keywords used in targeted advertising in a social network is provided. The method comprises, in part, receiving a search query for a person in a social network, where the person is associated with a webpage on the social network; retrieving the webpage of the person on the social network; and extracting one or more keywords from the webpage.

In another embodiment of the present invention, a computer system for providing targeted advertising in a social network is provided. More specifically, the computer system comprises, in part, a search request receiving component configured to receive a search query from a user, where the search query includes a person on the social network; a retrieving component configured to retrieve a webpage associated with the person on the social network; and a keyword extracting component configured to extract one or more keywords from the webpage associated with the person on the social network.

In yet another embodiment in accordance with the present invention, one or more computer storage medium with computer-executable instructions embodied thereon for performing a method for providing targeted advertising on a social network is provided. The method comprises, in part, receiving a search query, where the search query is associated with a person in a social network and the person is associated with a webpage on the social network; retrieving the webpage of the person on the social network; extracting one or more keywords from the webpage; determining a value of the one or more keywords using an advertising system, where advertisers bid on the value of the one or more keywords; and providing the presentation of advertisements of the advertisers.

Having briefly described an overview of embodiments of the present invention, an exemplary operating environment suitable for use in implementing embodiments of the present invention is described below.

Figure 1:
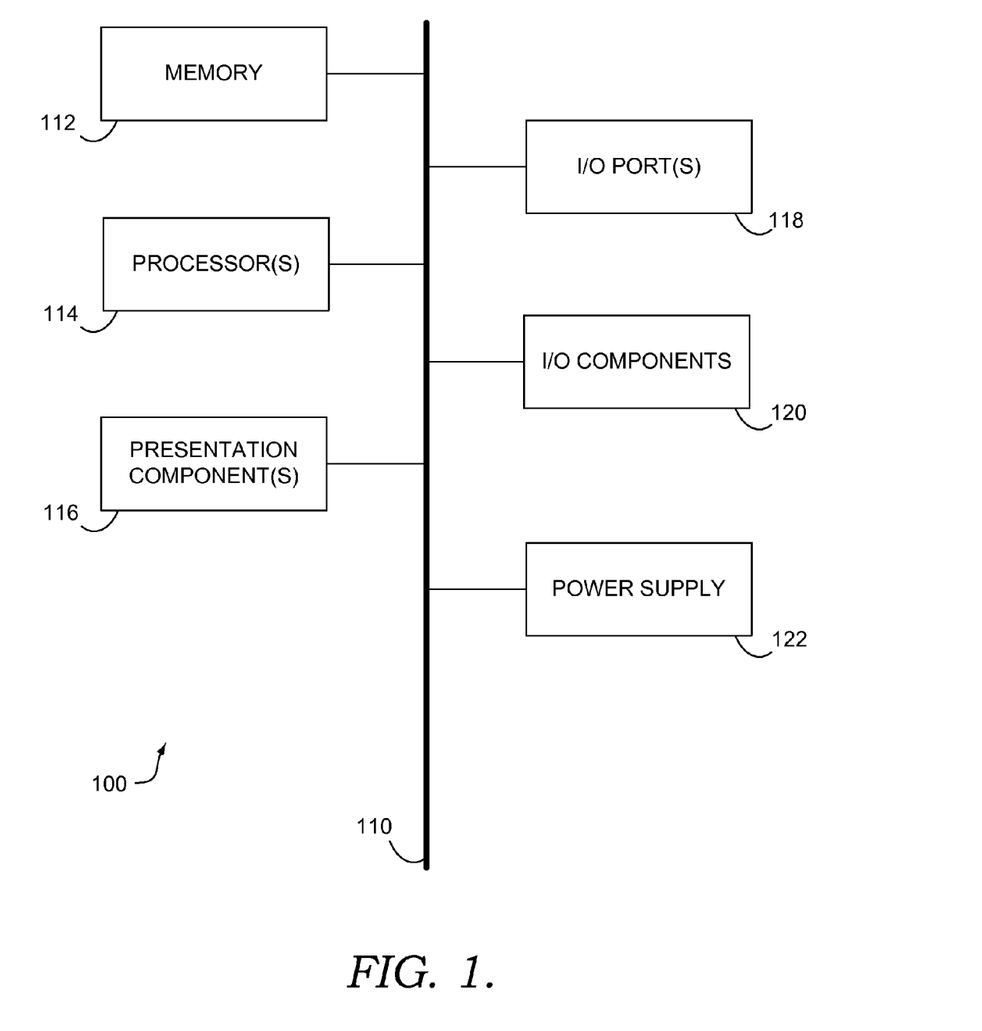
FIG. 1 is a block diagram of a computing system environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the illustrated computing environment be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the present invention may be practiced in a variety of system configurations, including hand-held devices, consumer electronics, general-purpose computers, specialty-computing devices, and the like. Embodiments of the present invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disk drives, and the like. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game advertisement, satellite dish, scanner, printer, wireless device, and the like.

Figure 2:
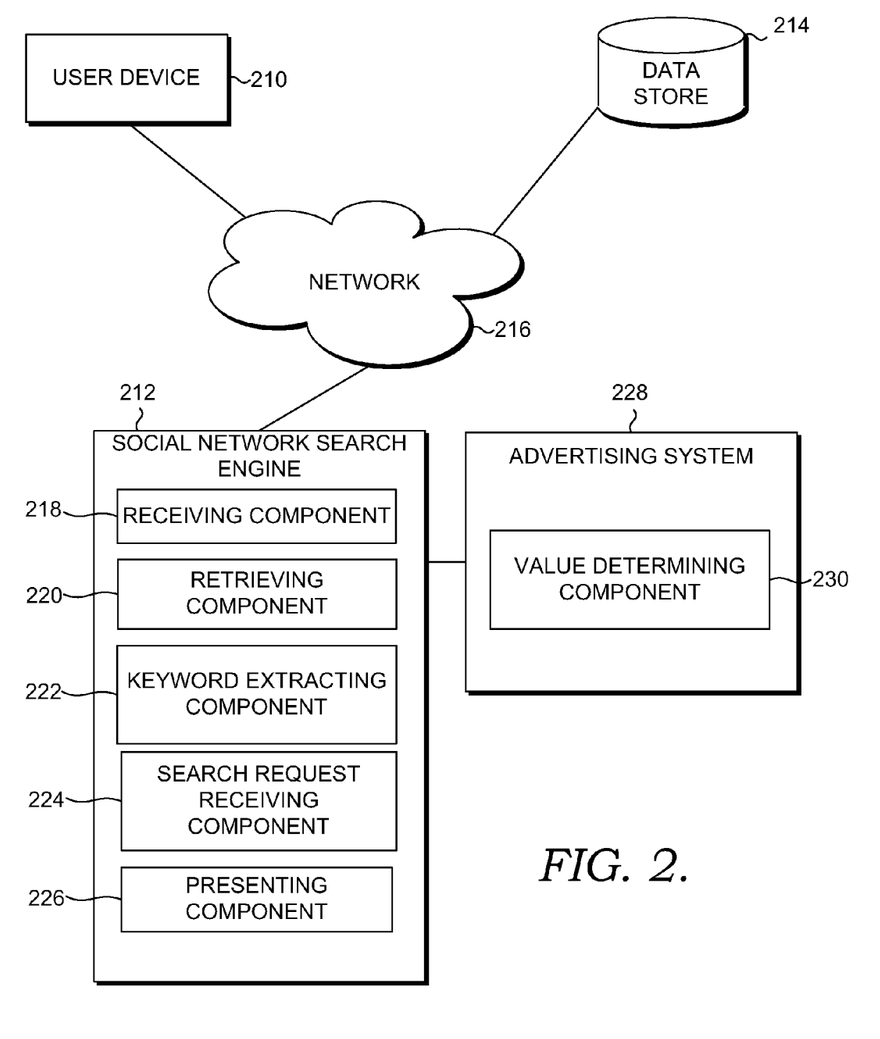
FIG. 2 is a block diagram illustrating an overview of a system in accordance with an embodiment of the invention.

Turning now to FIG. 2, a block diagram is illustrated that shows an exemplary computing system 200 configured to extract keywords from searches within a social network, in accordance with an embodiment of the present invention. It will be understood and appreciated by those of ordinary skill in the art that the computing system 200 shown in FIG. 2 is merely an example of one suitable computing environment and is not intended to suggest any limitation as to the scope of use or functionality of the present invention. Neither should the computing system 200 be interpreted as having any dependency or requirement related to any single component/module or combination of components/modules illustrated therein.

Computing system 200 includes a social network search engine 212, a user device 210, and a data store 214 all in communication with one another via a network 216. The network 216 may include, without limitation, one or more local area networks (LANs) and/or wide area networks (WANs). Such networking environments are commonplace in offices, enterprise-wide computer networks, intranets, and the Internet. Accordingly, the network 216 is not further described herein.

The data store 214 may be configured to store information associated with various types of content, as more fully described below. It will be understood and appreciated by those of ordinary skill in the art that the information stored in the data store 214 may be configurable and may include any information relevant to online content. Further, though illustrated as a single, independent component, data store 214 may, in fact, be a plurality of data stores, for instance, a database cluster, portions of which may reside on a computing device associated with the social network search engine 212, the user device 210, another external computing device (not shown), and/or any combination thereof.

Each of the social network search engine 212 and the user device 210 shown in FIG. 2 may be any type of computing device, such as, for example, computing device 100 described above with reference to FIG. 1. By way of example only and not limitation, the social network search engine 212 and/or the user device 210 may be a personal computer, desktop computer, laptop computer, handheld device, mobile handset, consumer electronic device, and the like. It should be noted, however, that the present invention is not limited to implementation on such computing devices, but may be implemented on any of a variety of different types of computing devices within the scope of the embodiments hereof.

As shown in FIG. 2, the social network search engine 212 includes a receiving component 218, a retrieving component 220, an extracting component 222, a search request receiving component 224, and a presenting component 226. In some embodiments, one or more of the illustrated components 218, 220, 222, 224, and 226 may be implemented as stand-alone applications. In other embodiments, one or more of the illustrated components 218, 220, 222, 224, and 226 may be integrated directly into the operating system of the social network search engine 212 or the user device 210. In the instance of multiple servers, embodiments of the present invention contemplate providing a load balancer to federate incoming queries to the servers. It will be understood by those of ordinary skill in the art that the components 218, 220, 222, 224, and 226 illustrated in FIG. 2 are exemplary in nature and in number and should not be construed as limiting. Any number of components may be employed to achieve the desired functionality within the scope of the embodiments of the present invention. In some embodiments, the social network search engine 212 further includes an advertising system 228, and within advertising system 228, a value determining component 230 may be provided. The advertising system 228, as the other illustrated components of the social network search engine 212, may be implemented as a stand-alone application or may be integrated directly into the operating system of the social network search engine 212.

The receiving component 218 is configured for receiving content associated with data sources. A data source may be any source, such as a webpage or data. More specifically, the received content is associated with users on a social network.

Once received by the receiving component 218, the content may be stored, for instance, in association with data store 214, such that it is searchable to determine satisfaction of a user query, as more fully described below. Such received content may additionally be indexed, if desired.

The retrieving component 220 is configured for retrieving a webpage on a social network associated with a person, particularly for a person that is the subject of a search query. The retrieval of a webpage may depend upon the search query inputted by the user. That is, if the query is a person's name, the retrieving component 220 will search the social network for a user with the inputted name. If multiple users in the overall social network have the inputted name, the receiving component 220 may choose a person that is nearest to the user by, for example, selecting the person that is within the user's selected social network. After the correct person of the search query has been identified, the alias of the person may be determined.

In other embodiments in accordance with the present invention, the inputted search query may not correspond to a specific user's name within the overall social network. If this is the case, the retrieving component 220 will examine the inputted search query to determine whether it instead represents the alias of a user on the social network. An alias provides a label to the social network and the users of a social network to identify an individual user. Thus, there will be only one user for each alias. Once the alias has been determined, the retrieving component 220 can find the user profile associated with the alias for the social network. The identification of an alias may also lead to the retrieval of a webpage associated with the alias. A webpage on a social network contains various content and information, including a user profile, web log or blog that may consist of posts provided by the person and presented on the social network, photos, friend lists, etc.

The keyword extracting component 222 is configured to extract keywords, which then may be provided to an advertising system (e.g., advertising system 228 in FIG. 2). One skilled in the art will appreciate that any suitable method of extracting keywords, such as extracting algorithms, may be used. Keywords may be extracted from any source information that is associated with the webpage. For example, in one embodiment, keywords can be extracted from the profile data of the queried user. As discussed above, a member of a social network may have a user profile that contains various profile data provided by the person. This profile data may contain an enumerated list of interests specified by the queried user. Exemplary interests may include favorite bands or artists, favorite sports, favorite restaurants, and the like.

In other embodiments, the keyword extracting component 222 may extract keywords from the webpage associated with the queried user on the social network. More specifically, the keyword or keywords may be extracted from the text of the webpage, such as from comments provided on the user. As one skilled in the art will appreciate, there are various methods in the art capable of extracting keywords. For example, keywords may be words that appear most frequently on the webpage, or words that are prominently displayed, for example, words that are in bold, underlined, italicized, and the like.

The search request receiving component 224 is configured for receiving a search request for which satisfying content is desired. By way of example, the search request may be received at a user interface as the result of user input. It will be understood and appreciated by those of ordinary skill in the art that multiple methods exist by which a user may input a search request. For instance, search requests may be input, by way of example only, utilizing a keyboard, joystick, trackball, touch-advertisement, or the like. Alternative user interfaces known in the software industry are contemplated by the invention. The search request is typically a user-initiated action or response that is received at a user interface, as discussed above. Examples of a request are a click, click-through, or selection by a user, e.g., human user or robotic user; however, it is understood and appreciated by one of ordinary skill in the art that a request may take any number of forms of indication at a web page. Further, it is contemplated by the present invention that a robotic user may be any non-human operator (i.e., an internet bot, web bot program, virus, robot, web crawler, web spidering program, or any software applications that run automated tasks over the Internet), which is an artificial agent that, by its actions, conveys a sense that it has intent or agency of its own. Even further, a human user is contemplated as being a human, but also, an entity (virtual or physical) acting under the present intent of a human operator.

The presenting component 226 is configured for presenting at least one of search results and information relating to the advertising based on the keywords extracted by the keyword extracting component 222. Typically such presentation will be by way of display in associations with a user interface. However, other forms of presentation, including audio presentation and audio/video presentation, are contemplated to be within the scope of embodiments hereof.

The value determining component 230 is configured for determining a value for the keywords extracted by the keyword extracting component 222. As illustrated in FIG. 2, the value determining component 230 resides in an advertising system 228 connected to the social network search engine 212. One skilled in the art will appreciate and understand that this illustration is but one embodiment of the present invention. A value of each keyword may be determined using any appropriate or suitable method, as will be more fully described below.

Figure 3:
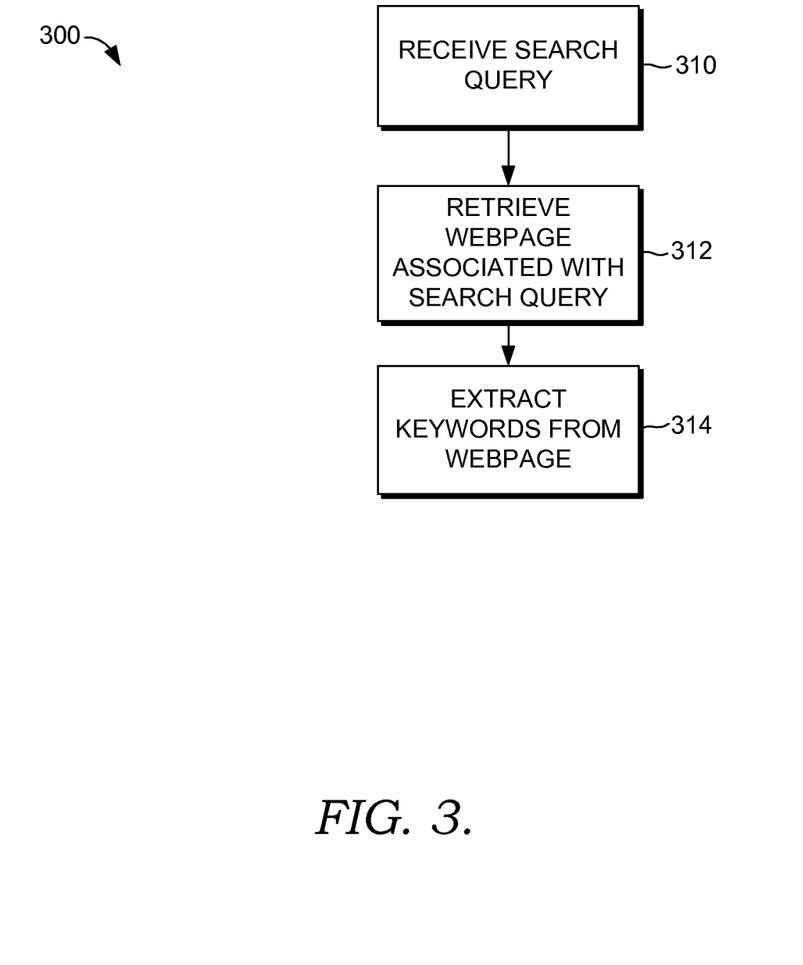
FIG. 3 is a flow diagram illustrating a method for directing a search to a data source, in accordance with an embodiment of the invention.

Turning now to FIG. 3, an exemplary method 300 for determining keywords used in targeted advertising is illustrated. Initially, as indicated in block 310, a search query is received (e.g., utilizing the search request receiving component 224 in FIG. 2). More particularly, the search query is entered by a user within a social network to locate another webpage within the social network. Such a user may be identified if they have logged into the social network. The search query may include the name of another user or an alias of another user. At block 312, a webpage corresponding to the search query is retrieved (e.g., by utilizing the retrieving component 220 in FIG. 2). As discussed above, the webpage may be retrieved by determining whether the inputted query represents another user within the social network, and if so, locating the webpage associated with the queried user. If the search query does not correspond to a particular user, and instead corresponds to multiple users, the user's particular, personal social network may be examined to determine whether any of the queried users exists in the user's social network. The user more closely related to the user that inputted the search query will be determined to be the correct user, and the webpage associated with that user will be retrieved. In some embodiments, an alias may be entered as the search query instead of a user's name.

Next, at block 314, one or more keywords are extracted from the webpage retrieved at block 312. As discussed above, any suitable method known in the art may be used to extract keywords. For example, the interests of the queried user included in the profile data of the queried user's webpage may be used for keywords. Alternatively, or in addition to these keywords, the text of the webpage (e.g., the text of comments provided by the queried user) may be searched and keywords may be extracted therefrom.

Figure 4:
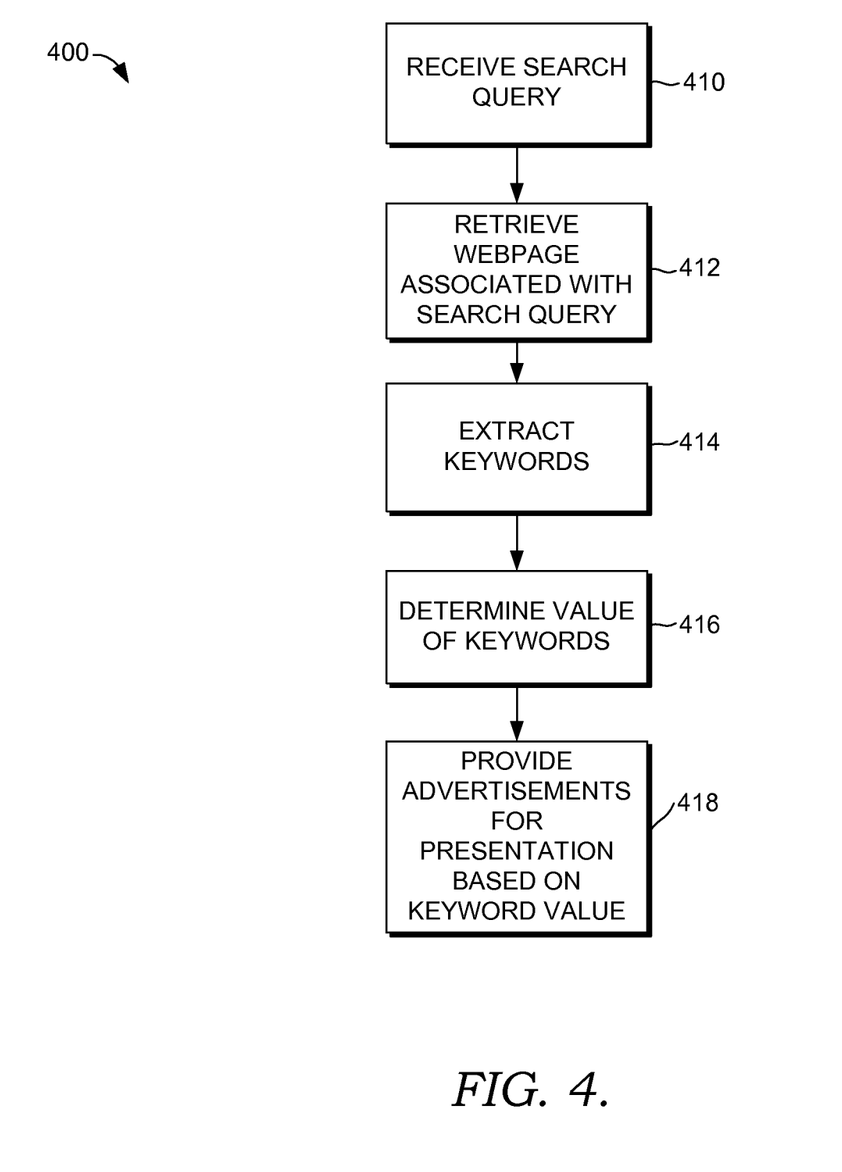
FIG. 4 is a flow diagram illustrating a method in accordance with an embodiment of the invention.

Turning now to FIG. 4, an exemplary method 400 illustrating a method for providing targeted advertising is provided. As indicated at block 410, a search query is received for a search of a social network (e.g., by utilizing the receiving component 218 in FIG. 2). Next, at block 412, a webpage is retrieved that is associated with the search query inputted at block 410 (e.g., by utilizing retrieving component 220 in FIG. 2). Similar to the method provided in FIG. 3, keywords are extracted at block 414 (e.g., by utilizing the keyword extracting component 222 in FIG. 2). The keywords may be extracted from any information that is associated with the webpage, for example, the profile data of the queried user, the text of the webpage, friend lists, photos, etc.

At block 416, the value of each extracted keyword is determined (e.g., by utilizing the value determining component 230 in FIG. 2). A value may be determined using a traditional advertising system, such as advertising system 228 in FIG. 2, or may be determined using any method known to one skilled in the art. In embodiments in accordance with the present invention, a value may be determined by having advertisers bid on each keyword. The competition of bids for a keyword would then drive the value of the keyword higher. As a result of being the highest bidding advertiser, the advertiser's advertisement would have optimal placement on the webpage presented in response to the search query for a webpage within the social network. The advertisements are presented based on the keyword value. This is indicated at block 418. As discussed above, the advertisements may be received from another data store (e.g., data store 214 in FIG. 2), where the keywords have been provided and the relevant ad bids have been returned.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. One or more computer memory devices with computer-executable instructions embodied thereon for performing a method for determining keywords used in targeted advertising in a social network, the method comprising:
    receiving, from a first user of the social network, a search query for a person on the social network, wherein the first user is associated with the first user's own personal network;
    determining two or more persons on the social network that satisfy the received search query;
    determining one of the two or more persons on the social network that is most closely related to the first user by examining the first user's own personal network, such determination being made without further input from the first user;
    retrieving a webpage associated with the one of the two or more persons in the social network that is determined to satisfy the received search query and that is most closely related to the first user; and
    extracting, using a keyword extracting component, one or more keywords from text of the retrieved webpage associated with the one of the two or more persons in the social network that is determined to satisfy the received search query and that is most closely related to the first user such that the one or more keywords are used to select one or more advertisements for presentation to the first user in association with the webpage associated with the one of the two or more persons in the social network determined to satisfy the received search query and that is most closely related to the first user.

2. The one or more computer storage media of claim 1, wherein the search query comprises a name of a second user on the social network.

3. The one or more computer storage media of claim 1, wherein the search query comprises an alias of a second user on the social network.

4. The one or more computer storage media of claim 1, wherein the search query comprises a name of two or more users on the social network.

5. The one or more computer storage media of claim 4, wherein the first user has a personal social network within the social network, and wherein the queried person is within the personal social network of the first user.

6. The one or more computer storage media of claim 1, wherein the method further comprises determining a value of the one or more keywords.

7. The one or more computer storage media of claim 6, wherein the method further comprises providing a presentation of advertisements of advertisers that have bid on the keywords.

8. A computer system for executing a method by one or more computer processors for providing targeted advertising in a social network, the computer system comprising:
    a search request receiving component that receives, from a first user of the social network, a search query for a person on the social network, the search query corresponding to two or more persons on the social network;
    a determining component that determines two or more persons on the social network that satisfy the received search query and, without further user action, determines that one of the two or more persons on the social network is most closely related to the first user;
    a retrieving component that retrieves a webpage associated with the one of the two or more persons on the social network that satisfies the received search query and that is most closely related to the first user; and
    a keyword extracting component that extracts one or more keywords from text of the retrieved webpage associated with the one of the two or more persons in the social network that is determined to satisfy the received search query and that is most closely related to the first user such that the one or more keywords are used to select one or more advertisements for presentation in association with the associated webpage to the first user.

9. The computer system of claim 8, further comprising an advertising system.

10. The computer system of claim 9, wherein the advertising system comprises a value determining component that determines a value for each of the one or more keywords.

11. The computer system of claim 9, further comprising a presenting component that provides a presentation of advertisements from the advertising system.

12. The computer system of claim 8, wherein the search request receiving component receives a search request for a name of a person within the social network.

13. The computer system of claim 8, wherein the search request receiving component receives a search request for an alias of a person within the social network.

14. One or more computer memory devices with computer-executable instructions embodied thereon for performing a method for providing targeted advertising on a social network, the method comprising:
receiving a search query from a first user of the social network,
the query being for a person on the social network;
determining two or more persons on the social network that satisfy the received search query;
determining that one of the two or more persons on the social network is most closely related to the first user, such determination being made without further input from the first user;
retrieving a webpage associated with the one of the two or more persons on the social network that is most closely related to the first user, the webpage having information associated therewith;
extracting, using a keyword extracting component, one or more keywords from text of the retrieved webpage associated with the one of the two or more persons in the social network that is determined to satisfy the received search query and that is most closely related to the first user, such that the one or more keywords are used to select one or more advertisements for presentation in association with the associated webpage, such presentation being to the first user in response to the received search query; and
determining a value of the one or more keywords using an advertising system, wherein advertisers bid on the value of the one or more keywords, and where the one or more keywords have not been previously bid by the advertisers.

15. The one or more computer storage media of claim 14, wherein the method further comprises:
providing for an optimal presentation of the one or more advertisements based on the value of the one or more keywords.

16. The one or more computer storage media of claim 14, wherein the search query comprises an alias for the person on the social network.

17. The one or more computer storage media of claim 14, wherein the information associated with the webpage includes a profile of the person on the social network.

18. The one or more computer storage media of claim 14, wherein the information associated with the webpage includes the text of the webpage of the person on the social network.

* * * * *